POLYBIPOLAR SYSTEM

Filed Feb. 4, 1964 2 Sheets-Sheet 1

INVENTOR.
ADAM LENDER
BY
Lippincott, Ralls & Hendricson
ATTORNEYS

INVENTOR.
ADAM LENDER
BY
Lippincott, Ralls & Hendricson
ATTORNEYS

United States Patent Office 3,317,720
Patented May 2, 1967

3,317,720
POLYBIPOLAR SYSTEM

Adam Lender, Palo Alto, Calif., assignor, by mesne assignments, to Automatic Electric Laboratories, Inc., Northlake, Ill., a corporation of Delaware Filed Feb. 4, 1964, Ser. No. 342,412
9 Claims. (Cl. 235—154)

This invention relates to a polybipolar transmission system, including method and apparatus for converting a conventional binary waveform into a polybipolar waveform, and method and apparatus for converting the polybipolar waveform back to binary. The term "polybipolar" is defined herein as a waveform having at least five signalling levels, derived according to the teachings of this invention. In prior art conventional bipolar transmission systems, three signalling levels are used. The channel capacity is the same as in binary transmission, but there are no D.-C. or low frequency components. Bipolar transmission therefore avoids the necessity of using a carrier to eliminate the D.-C. and low frequencies. This is desirable, for example, in pulse-code modulation (PCM) systems or other systems which pass the signal through transformers incapable of passing D.-C. components.

To increase channel capacity over that of bipolar, but still have a system useful where bipolar systems have been used in the past, a conventional multilevel system cannot be employed since most such multilevel systems have a D.-C. or low frequency component. And substantial additional equipment would be required to introduce a carrier into a multilevel system to eliminate these D.-C. and low frequency components.

The polybipolar system of the present invention provides the increased channel capacity of multilevel systems, but still has no D.-C. or low frequency components—and no carrier is required. When a standard fixed bandwidth bipolar system provides inadequate channel capacity for a particular purpose, the polybipolar system of this invention may be used in its stead. The polybipolar system, moreover, results in a relatively low signal-to-noise ratio penalty relative to bipolar, in spite of the substantial increase in channel capacity.

Before turning to a description of the polybipolar system of this invention, a brief description of conventional bipolar systems is helpful. A bipolar signal is a well-known three-level coded signal. Binary zero becomes the center level, and binary one is alternately a positive or negative pulse. The coding rules require that a positive pulse must always be followed by a negative pulse, and vice versa. For example, if two binary ones appear and the first becomes a positive pulse, the second would become a negative pulse. It would make no difference whether or not any binary zeros appeared between these two binary ones; the first would still be positive and the second negative. As a consequence of this coding system, it is possible to have a two-level difference between consecutive pulses.

The bipolar spectrum has the following spectral density:

$$W_1(f)=\frac{1}{T}\left|G(f)\right|^2(\sin \pi fT)^2 \qquad (1)$$

For rectangular pulses, $$G(f)=T\frac{\sin \pi fT}{\pi fT} \qquad (2)$$

Substituting Equation 2 into Equation 1, $$W_1(f)=T\frac{(\sin \pi fT)^4}{(\pi fT)^2} \qquad (3)$$

Polybipolar systems of this invention have an odd number of signalling levels, equal to at least five. Their spectrum has a similar shape to bipolar, as shown in Equation 3. A polybipolar system is capable of representing more than one bipolar channel over the same bandwidth that has in the past been used to represent only a single bipolar channel. As with conventional bipolar signals, polybipolar signals have no D.-C. component and either one or two-level jumps are possible from one pulse to the next. Moreover, like bipolar, the center level of a polybipolar waveform represents binary zero.

Assume that a binary waveform with two signalling levels (MARK and SPACE) and a digital duration of T seconds is transformed into a waveform with $b$ signalling levels, where $b$ is an odd integer, with a digital duration of T seconds. The rules governing the $b$ level polybipolar message are orderly in the sense that each digit is still unambiguously defined as a binary MARK or SPACE, depending upon its level. To arrive at such an unambiguous designation, the levels are numbered consecutively in each direction from the center level (which represents binary 0), i.e., $\pm 1$, $\pm 2$, $\pm 3$, etc. The levels adjacent to the center on either side are thus binary 1. The next adjacent pair of levels are binary 0; and so on. Accordingly, there is symmetry about the center level. All even-numbered levels, starting from the center level, may be identified as SPACE, and all odd-numbered levels, starting from center, are then identified as MARK. Needless to say, these designations can easily be reversed to designate even-numbered levels as MARK and odd-numbered levels as SPACE. For the purposes of this discussion, the first-named convention above will be adhered to, as follows:

SPACE=binary 0=even levels (counting from center);
MARK=binary 1=odd levels (counting from center).

For any given bandwidth, the number of binary channels represented by a $b$ level polybipolar system is equal to $(b-1)/2$.

Briefly, the method of converting a conventional binary digital waveform into a polybipolar digital waveform comprises the steps of:

(a) Combining the present binary pulse with the binary output pulses generated in the previous $(b-2)$ combinations of this step (a), where $b$ is an odd integer greater than three, and providing a binary output pulse of one polarity (binary 1, for example) if the number of binary ones in said combinations is even, and a binary output pulse of the opposite polarity (binary 0, for example), if the number of binary ones is odd;

(b) Inverting the final $(b-1)/2$ of the $(b-1)$ successive binary output pulses from step (a) and (c) Adding the $(b-1)$ successive binary output pulses from step (a) including said $(b-1)/2$ inverted final pulses from step (b) to obtain a polybipolar output signal.

In the above step (b), "inverting" a binary pulse is defined as follows: binary 1 is changed to $-1$, and binary 0 remains 0 $(+0=0)$.

The polybipolar waveform generated by the method described above may be readily compared with a conventional bipolar waveform. The waveform obtained in step (a) above is not yet a polybipolar waveform; it is an intermediate waveform having the same probability for binary 1 and binary 0 (i.e., equal) as the original binary waveform, and therefore it has the same binary spectral density defined in Equation 1, above. The polybipolar waveform obtained in step (c) above is the sum of $(b-1)$ successive binary digits from the waveform obtained in step (a), with the inversions instituted in step (b). The spectral density of this polybipolar waveform is thus:

$$W_2(f)=\frac{1}{4T}|G(f)|^2\left|1+e^{-j\omega T}+e^{-j2\omega T}+\cdots+e^{-j\left(\frac{b-1}{2}-1\right)\omega T}-e^{-j\left(\frac{b-1}{2}\omega T\right)}-e^{-j\left(\frac{b-1}{1}+1\right)\omega T}-\cdots-e^{-j(b-2)\omega T}\right|^2 \quad (4)$$

Note that the right-hand side of Equation 4 has exactly $(b-1)$ terms, of which the first $(b-1)/2$ terms are positive and the last $(b-1)/2$ terms are negative. The above simplifies to:

$$W_2(f)=\frac{1}{4T}|G(f)|^2\left|\frac{\left(1-e^{-j\left(\frac{b-1}{2}\right)\omega T}\right)^2}{1-e^{-j\omega T}}\right|^2 \quad (5)$$

Also, $$\left|1-e^{-j\partial\omega T}\right|^2=\left(2\sin\frac{\partial\omega T}{2}\right)^2 \quad (6)$$

Substituting (2) and (6) into (5) for a polybipolar spectrum:

$$W_2(f)=\left(\frac{b-1}{2}\right)^2 T\frac{\left[\sin\frac{(b-1)}{2}\pi fT\right]^4}{\left[\frac{(b-1)}{2}\pi fT\right]^2} \quad (7)$$

Comparison of the bipolar spectrum of Equation 3, above, and the polybipolar spectrum of Equation 7, having $b$ levels ($b$ is an odd integer greater than three) indicates that the polybipolar spectrum is compressed by a factor $$\left(\frac{b-1}{2}\right)$$

relative to the bipolar. Equivalently, a $b$ level polybipolar waveform represents $(b-1)/2$ bipolar channels over a fixed bandwidth.

The resultant noise increase with an increase in the number of signalling levels can be approximated for a polybipolar system and compared with a prior art bipolar system. Assuming K is the number of bipolar channels in the polybipolar waveform, then $$b=2K+1 \quad (8)$$

The normalized noise penalty for a polybipolar waveform relative to conventional bipolar is:

$$10\log_{10}[(b-1)/2]^2-10\log_{10}K \quad (9)$$

Combining Equations 8 and 9, the noise penalty of a polybipolar waveform with $b$ levels relative to a single bipolar channel is:

$$10\log_{10}K\,db \quad (10)$$

The details of the polybipolar system of this invention, and the apparatus used for conversion of a binary waveform to polybipolar, and reconversion from polybipolar to binary, are best seen in the more detailed description which follows. The detailed description makes reference to the following drawings, in which.

Figure 1:
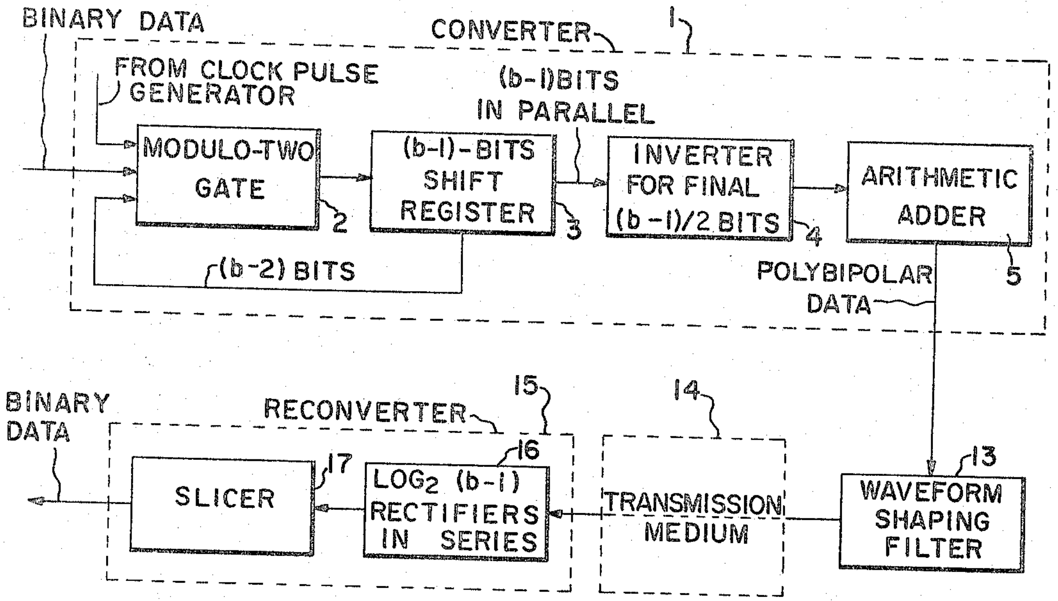
FIG. 1 is a block diagram of the polybipolar transmission system of this invention.

Referring to FIG. 1, briefly, the apparatus of this invention for transmitting binary digital waveforms by converting them into polybipolar digital waveforms having $b$ levels (where $b$ is an odd integer greater than three) includes converter 1. This converter 1 receives the binary data at its input and converts it to a polybipolar waveform at its output. Converter 1 includes a combining means such as modulo-two gate 2. Gate 2 combines the present binary pulse at its input with the binary output pulses generated at the previous $(b-2)$ combinations carried out in the combining means. Gate 2 provides a binary 1 output pulse if the number of binary ones in the combination is odd, and no output pulse (binary 0) if the number of binary ones is even. In other words, modulo-two gate 2 makes strictly binary decisions. If the total number of binary ones at its input received from both the binary data and the $(b-2)$ stages of $(b-1)$-bit shift register 3 is even, gate 2 has no output (binary 0); if odd, it has an output pulse (binary 1). The input to modulo-two gate 2 from a conventional clock pulse generator (not shown) insures that the binary data enters the modulo-two gate in a synchronized manner.

The converter 1 also includes a remembering means, or $(b-1)$-bit shift register 3. A $(b-1)$-bit shift register is well known in the art. The input of $(b-1)$-bit shift register 3 is connected to the output of modulo-two gate 2. The $(b-1)$-bit shift register remembers the $(b-1)$ successive output pulses from the modulo-two gate. It is adapted to provide an output pulse from each bit denoting whether that bit is zero or one. The outputs remembering the initial $(b-2)$ combinations of the $(b-1)$ combinations in the modulo-two gate 2 are connected to the input of the modulo-two gate 2, as shown. The outputs for the first $(b-2)$ bits of the register are thus fed back in parallel to modulo-two gate 2. For example, if $(b-1)$-bit shift register 3 is a 4-bit shift register ($b=5$), the first three bits from the first three flip-flops of the shift register are fed back to the modulo-two gate.

The $(b-1)$ bits in parallel from $(b-1)$-bit shift register 3 are passed through inverter 4 to arithmetic adder 5. Inverter 4 is connected so that it inverts the final $(b-1)/2$ bits from the $(b-1)$-bit shift register. For example, where the shift register is a 4-bit shift register, the last two bits (5−1 divided by 2=2) are inverted prior to their transmission to arithmetic adder 5. An inverted 0 still remains zero, since $+0=-0$, and inverted 1 becomes −1. The $(b-1)$ bits, including the final $(b-1)/2$ inversions, are then passed to arithmetic adder 5.

An adding means, e.g., arithmetic adder 5, is connected to each of the outputs from the $(b-1)$-bit shift register 3 (including the final $(b-1)/2$ inversions from inverter 4), corresponding to each of $(b-1)$ successive binary output pulses from modulo-two gate 2. An arithmetic adder for $(b-1)$ bits may consist, for example, of $(b-1)$ resistors, one terminal from each being connected together to form the common output terminal, and the other terminal of each forming the separate inputs. The output signal from arithmetic adder 5 is the desired $b$-level polybipolar digital waveform.

Recalling that the last bit of the $(b-1)$-stage shift register 3 is not recycled to the modulo-two gate 2, a $(b-2)$-stage shift register may be substituted for the $(b-1)$-bit shift register 3. However, a second shift register having $(b-1)$ stages is then required to provide the proper input to arithmetic adder 5. The signals from this second shift register are passed through inverter 4 to arithmetic adder 5, which in turn is connected to waveform shaping filter 13. When two shift registers are so used, the second shift register, the arithmetic adder, the inverter, and the shaping filter may all be approximated by a single L-C network. The electrical effect of such a combined unit on the input signal is approximately the same as the four separate components. The L-C filter employed is designed according to filter design principles well established in the art.

Figure 2:
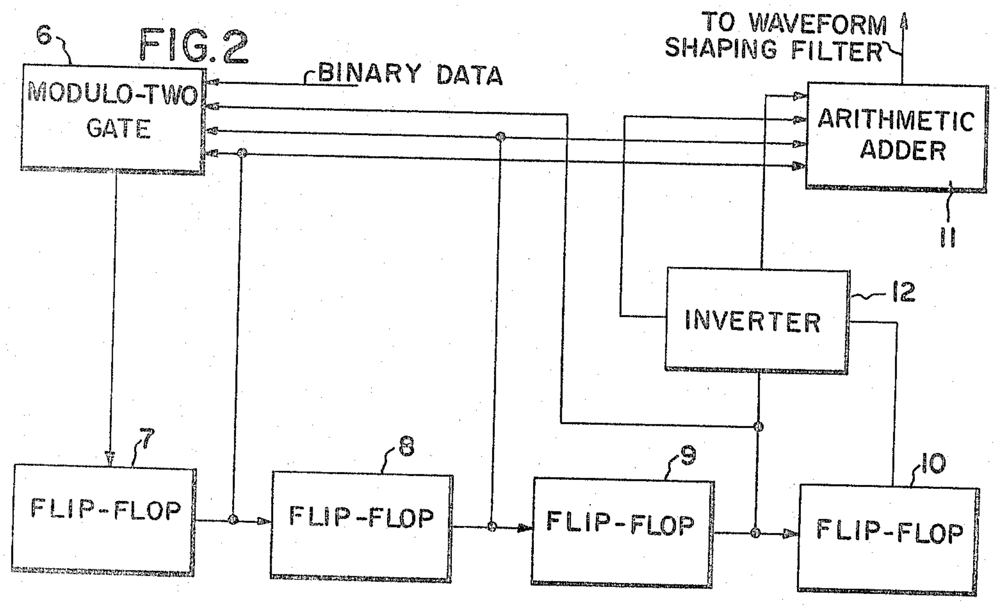
FIG. 2 is a block diagram of the binary-to-polybipolar converter for a polybipolar system where $b=5$.

Referring now to FIG. 2, a specific binary-polybipolar converter is illustrated. This converter is applicable where $b=5$. Modulo-two gate 6 corresponds to modulo-two gate 2 shown in FIG. 1. Flip-flops 7, 8, 9, and 10 together make up a four-bit shift register. Flip-flops 7, 8, and 9 hold the first $(b-2)$ bits, and flip-flop 10 holds the $(b-1)$th (4th) bit. As shown in FIG. 2, the output of flip-flops 7, 8, and 9, holding the first three $(b-2)$ bits are all connected to the input of modulo-two gate 6. These outputs are also connected to arithmetic adder 11. The outputs from the last two flip-flops 9 and 10 are passed through inverter 12 on their way to adder 11, according to the invention. Finally, the output of flip-flop 7 is connected to the input of flip-flop 8; the output of flip-flop 8 is connected to the input of flip-flop 9; and the output of flip-flop 9 is connected to the input of flip-flop 10. These connections are conventional for a cascaded flip-flop shift register. The output of flip-flop 10 is the terminal output of the shift register, and is connected only to arithmetic adder 11 through inverter 12. Arithmetic adder 11 is connected to a waveform shaping filter such as filter 13 in FIG. 1.

Figure 3:
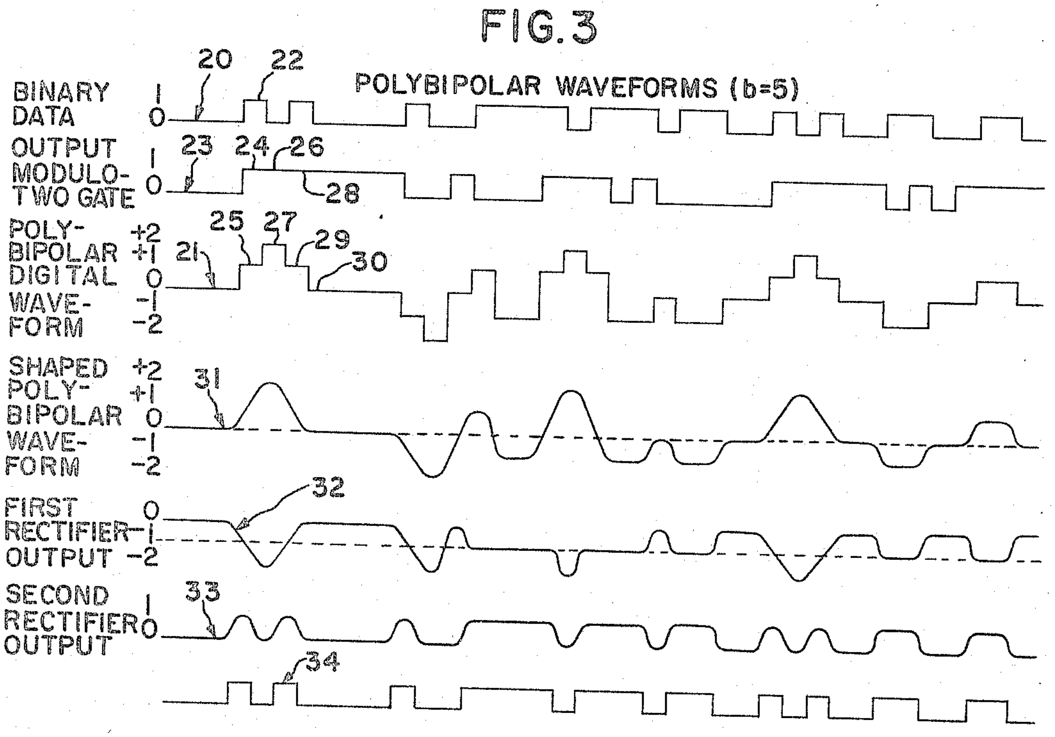
FIG. 3 shows a series of waveforms obtained in the conversion of a binary waveform to a polybipolar waveform, and in the reconversion of the polybipolar waveform into a binary waveform.

Making reference to the apparatus shown in FIG. 2, and to the graph of FIG. 3, the generation of a polybipolar waveform can be explained. The binary data shown in waveform 20 appears as an input to the modulo-two gate 6. Let us assume (although it is not required) that all the flip-flops were set to zero prior to the input of the binary data. Let us further assume that this modulo-two gate 6 generates a zero output with an even number of ones, and a one output with an odd number of ones. During the first three input pulses (binary zeros) all the inputs to the modulo-two gate are zero. Since there are then zero ones, and since zero is an even number, the output of the modulo-two gate 6 will be zero. However, flip-flops 9 and 10 are at zero, so that two zeros are presented to adder 11 by inverter 12. These combine to put the output of adder 11 at the zero (center) level, as shown in waveform 21. At the receipt of the first positive binary input pulse 22, modulo-two gate 6 will have three zero inputs (from flip-flops 7, 8, and 9) and a single one input from the binary data pulse which is a one. There are thus an odd number of ones appearing at the input to modulo-two gate 6. The output pulse of the gate is therefore a one, as shown in waveform 23 at pulse 24. This output pulse enters flip-flop 7 of the shift register, setting it to one. The output pulse from flip-flop 7 then provides another "one" to adder 11 which combines with the zeros from inverter 12, causing it to provide +1 level output signals, shown as pulse 25 in waveform 21. Flip-flops 8 and 9 remain at zero.

The next binary pulse of binary waveform 20 is a zero. Flip-flop 7 is the only one containing a one, and this contributes the only one as an input to modulo-two gate 6. Again, therefore, the output of modulo-two gate 6 is a one, since there is an odd number one inputs (one). This output of gate 6 is shown in waveform 23 as pulse 26. This output pulse from modulo-two gate 6 is passed to flip-flop 7, maintaining its setting at one. At the same time, the one previously contained in flip-flop 7 is passed to flip-flop 8, setting that flip-flop to one. Flip-flops 9 and 10 remain at zero. The ones in flip-flops 7 and 8 are both passed to added 11. These two ones combine with the zeros from inverter 12 to cause the adder to provide +2 level output pulse, shown as pulse 27 in waveform 21.

The next binary input to modulo-two gate 6 is a one. Since flip-flops 7 and 8 also contain ones, a total of three ones appears at the input to modulo-two gate 6. As three is an odd number, the output from modulo-two gate 6 is again at one. This output pulse is shown as pulse 28 in waveform 23. This third output from modulo-two gate 6 passes to flip-flop 7, maintaining its setting at one. The one previously stored in flip-flop 7 passes to flip-flop 8, and the one previously stored in flip-flop 8 passes to flip-flop 9. The two ones in flip-flops 7 and 8 combine with the −1 in inverter 12 from flip-flop 10 to provide +1 level output signal. This signal is shown as pulse 29 in waveform 21. Note that the one in flip-flop 9 results in −1 at adder 11 from inverter 12.

The fourth consecutive binary one at the output from modulo-two gate 6 is again passed to flip-flop 7 to maintain its setting at one. The one condition of flip-flop 7 passes a one pulse to flip-flop 8, which in turn passes a one pulse to flip-flop 9, which in turn sets flip-flop 10 at one. This puts two ones into arithmetic adder 11 from flip-flops 7 and 8 (inverter 12 inverts the ones from flip-flops 9 and 10 to −1), causing it to provide zero (center) level output as shown as pulse 30 in waveform 21. The remainder of waveforms 21 and 23 are generated in the same manner, the details being left to the skill of the reader.

Referring now to FIGS. 1 and 2, the polybipolar output signal in digital form from arithmetic adder 5 is passed to a waveform shaping filter 13. This shaping filter converts waveform 21 into a shaped waveform 31. Note that the general shape of waveform 31 is the same as waveform 21. However, the sharp corners of waveform 21 have been removed by the shaping filter, as is known in the art. The shaped waveform 31 may be detected and interpreted exactly as could the irregular waveform 21. However, a rounded waveform has a finite bandwidth, and is thus considerably easier to transmit on most conventional transmission systems. The bandwidth is determined by the characteristics of filter 13, built according to principles well established in filter design.

The shaped polybipolar waveform from converter 1 is then transmitted over a conventional transmission medium 14 to reconverter 15. The reconverter is located in the receiver portion of the apparatus. The reconverter includes a means for sensing the level of the polybipolar signal transmitted during each binary pulse interval. Such a sensing means ascertains whether the level of the received polybipolar signal is an odd- or even-numbered level relative to the center level (which is always zero or even). In the embodiment of FIG. 1, the sensing means comprises a plurality of full-wave rectifiers connected in series. This may be employed wherever $b=2^n+1$ where $n$ is an integer. The required number of rectifiers is equal to $\log_2 (b-1)$. The input of the first of these rectifiers is connected to receive the transmitted polybipolar digital waveform. These rectifiers are represented by block 16.

The waveforms associated with the series-connected rectifiers 16 are shown in FIG. 3. Where $b=5$ the $\log_2$ of $(b-1)$ (i.e., 4) is two; therefore, two series-connected rectifiers are required.

Waveform 31 is passed into the first of series-connected rectifiers 16. Each rectifier is set at a D.-C. level at the midpoint of the waveform which appears at its input. With waveform 31, this midpoint appears at the zero (center) level, as shown by the dotted line. The rectifier therefore inverts the portion of waveform 31 above the dotted lines; the resulting waveform is shown as waveform 32. This waveform is then passed through the second of the series-connected rectifiers. This second rectifier is set at the middle or −1 level of waveform 32, as shown by the dotted line. The portion of the waveform above this first level is then inverted. The resulting waveform from the second rectifiers is shown as waveform 33. This waveform turns out to be substantially the same as the input binary data waveform 20. However, the output of the second rectifier will still have rounded peaks. Where square peaks are desired, so that the output waveform is an exact duplicate of the input binary data, the waveform 33 emergent from the series-connected rectifiers 16 may be passed through a slicer 17. Slicer 17 in the embodiment of FIG. 1 serves as a means to indicate that a binary pulse of one polarity corresponds to a polybipolar pulse of the transmitted polybipolar waveform when an odd-number level is sensed; and as a means to indicate that binary pulse of the opposite polarity corresponds to the polybipolar pulse of the transmitted binary waveform where an even-numbered level is sensed. The resulting waveform is shown in FIG. 3 as waveform 34. This waveform is an exact duplicate of binary input waveform 20.

Figure 4:
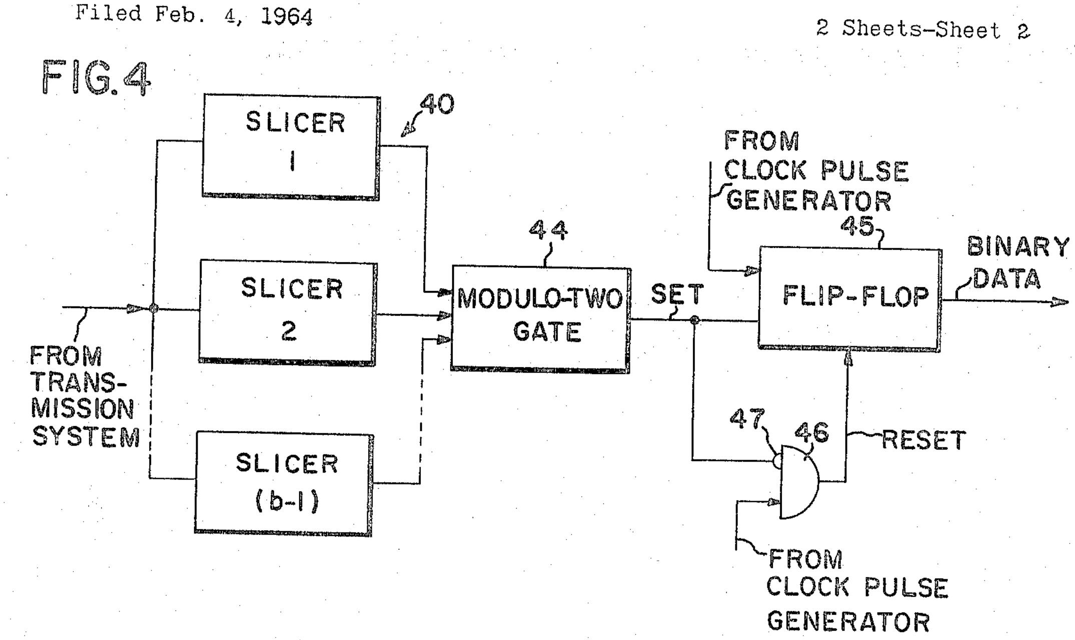
FIG. 4 is a block diagram of one embodiment of polybipolar-binary reconversion apparatus.

Another embodiment of a reconverter is shown in FIG. 4. In this embodiment, applicable for all values of $b$, the means for sensing the level of the polybipolar signal transmitted during each binary pulse interval is a plurality of slicers 40 connected in parallel. A total of $(b-1)$ slicers are needed for a polybipolar waveform of $b$ possible levels. The outputs of all three slicers are connected to the input of modulo-two gate 44. The plurality of slicers 40, together with modulo-two gate 44, provides the means for sensing the level of the polybipolar signal transmitted during each binary pulse interval to ascertain whether that level is an odd-numbered or an even-numbered level. When that level is an odd-numbered level in the embodiment of FIG. 4, an odd number of slicers will have a binary one output, and therefore modulo-two gate 44 will provide a one output pulse. Flip-flop 45 provides a means of indicating that a binary pulse of one polarity, e.g., a "one," corresponds to a polybipolar pulse of the transmitted polybipolar waveform when an odd-numbered level is sensed. The flip-flop also indicates that a binary pulse of the opposite polarity, e.g., a "zero," corresponds to a polybipolar pulse of the transmitted polybipolar waveform when an even-numbered level is sensed. The output pulses from modulo-two gate 44 are transmitted to the set input of flip-flop 45. These pulses are phased by pulses from a clock-pulse generator, as shown. When a zero pulse is received from modulo-two gate 44, coincident with a pulse from the clock-pulse generator, AND-gate 46 will provide a pulse to the reset input of flip-flop 45. Therefore, flip-flop 45 will provide a zero output pulse. The binary data emergent from the output of flip-flop 45 is therefore an exact reproduction of the input binary data. The output from modulo-two gate 44 is connected to AND-gate 46 through a conventional inhibitor 47, shown by its standard semicircular symbol. AND-gate 46 is also phased with the data by pulses from a clock-pulse generator, as shown.

Another way of reconverting the polybipolar waveform to binary utilizes a combination of full-wave rectifiers and slicers, each as discussed above. This method is applicable not only where $b=2^n+1$, as was the method using only full-wave rectifiers, but also when $b$ is any odd integer not equal to $2^n+1$. In the latter case, full-wave rectifiers are used for the conversion, as before, until the number of remaining levels is reduced to an even number. Then slicers are employed for the remainder of the reconversion in the same manner discussed above.

All of the individual circuit components such as flip-flops, AND-gates, modulo-two gates, slicer, shaping filters, and so on, are well known in the art. Other combinations of such components may be used to achieve the same binary-polybipolar conversions and polybipolar-binary reconversions carried out in the specific embodiments of the apparatus illustrated. However, the illustrated embodiments are merely representative and are not intended to limit the scope of this invention. Therefore, the only limitations to be placed upon that scope are those expressly stated in the claims which follow.

What is claimed is:

1. A method for transmitting binary digital waveforms by converting said waveforms into a polybipolar waveform, which method comprises the steps of:

(a) combining the present binary pulse with the binary output pulses generated in the previous $(b-2)$ combinations of this step (a), where $b$ is an odd integer greater than three, and providing a binary output pulse of one polarity if the number of binary ones in said combination is even, and of the opposite polarity if the number of binary ones is odd;

(b) inverting the final $(b-1)/2$ of the $(b-1)$ successive binary output pulses from step (a);

(c) adding said $(b-1)$ successive binary output pulses from step (a), including said $(b-1)/2$ inverted final pulses from step (b), to obtain a polybipolar waveform;

(d) transmitting said polybipolar waveform through a transmission medium to a receiver;

(e) at said receiver, sensing the level of said polybipolar signal during each pulse interval to ascertain whether that level is odd-numbered or even-numbered;

(f) indicating the receipt of a binary pulse of one polarity when an odd-numbered level has been sensed; and (g) indicating the receipt of a binary pulse of the opposite polarity when an even-numbered level has been sensed.

2. A method for converting a binary digital waveform into a polybipolar waveform, which method comprises the steps of:

(a) combining the present binary pulse with the binary output pulses generated in the previous $(b-2)$ combinations of this step (a), where $b$ is an odd integer greater than three, and providing a binary output pulse of one polarity if the number of binary ones in said combination is even, and of the opposite polarity if the number of binary ones is odd;

(b) inverting the final $(b-1)/2$ of the $(b-1)$ successive binary output pulses from step (a); and (c) adding said $(b-1)$ successive binary output pulses from step (a), including said $(b-1)/2$ inverted final pulses from step (b), to obtain a polybipolar output signal.

3. Apparatus for converting a binary digital waveform into a polybipolar waveform, which apparatus comprises:

(a) a combining means for combining the present binary pulse with the binary output pulses generated in $(b-2)$ successive combinations performed by said combining means, where $b$ is an odd integer greater than three, said combining means providing a binary output pulse of one polarity if the number of binary ones in said combination is even, and of the opposite polarity if the number of binary ones is odd;

(b) a remembering means connected to the output of said combining means, said remembering means having $(b-1)$ output terminals with levels indicating $(b-1)$ successive combinations carried out in said combining means, said output terminals being connected to the input of said combining means;

(c) inverting means for inverting the final $(b-1)/2$ of the $(b-1)$ successive combinations remembered in said remembering means;

(d) a means for adding said $(b-1)$ successive combinations, including said $(b-1)/2$ inverted final pulses from said inverting means, to obtain a polybipolar output signal to be transmitted;

(e) a means for sensing the level of the polybipolar signal transmitted during each pulse interval to ascertain whether that level is odd- or even-numbered;

(f) a means indicating a binary pulse of one polarity corresponding to the polybipolar pulse of said transmitted polybipolar waveform when an odd-numbered level has been sensed; and (g) a means indicating a binary pulse of the opposite polarity corresponds to the polybipolar pulse of said transmitted polybipolar waveform when an even-numbered level has been sensed.

4. Apparatus for converting a binary digital waveform into a polybipolar waveform, which apparatus comprises:

(a) combining means for combining the present binary pulse with the binary output pulses generated in $(b-2)$ successive combinations performed by said combining means, where $b$ is an odd integer greater than three, said combining means providing a binary output pulse of one polarity if the number of binary ones in said combination is even, and of the opposite polarity if the number of binary ones is odd;

(b) a remembering means adapted to remember $(b-1)$ successive output pulses from said combining means, said remembering means having its input connected to the output of said combining means, and having output means indicating the said (b—2) successive combinations, said output means connected to the input of said combining means; and (c) inverting means for inverting the final (b—1)/2 of the (b—1) successive combinations remembered in said remembering means; and (d) a means for adding the (b—1) successive remembered binary output pulses from said combining means, including said (b—1)/2 inverted final pulses from said inverting means, to obtain a polybipolar output signal.

5. Apparatus for converting a binary digital waveform into a polybipolar waveform, which apparatus comprises:

(a) a modulo-two gate for combining the present binary pulse with the binary output pulses generated in (b—2) successive combinations performed by said modulo-two gate, where n is an odd integer greater than three, said modulo-two gate providing a binary output pulse of one polarity if the number of binary ones in said combination is even, and of the opposite polarity if the number of binary ones is odd;

(b) a remembering means adapted to remember (b—1) successive output pulses from said modulo-two gate, said remembering means having its input connected to the output of said modulo-two gate and its output terminals indicating said (b—2) successive combinations connected to the input of said modulo-two gate;

(c) inverting means for inverting the final (b—1)/2 of said (b—1) successive remembered combinations; and (d) a means for adding the (b—1) successive remembered binary output pulses from said modulo-two gate, including said (b—1)/2 inverted final pulses from said inverting means, to obtain a polybipolar output signal.

6. Apparatus for converting a binary digital waveform into a polybipolar digital waveform, which apparatus comprises:

(a) a modulo-two gate for combining the present binary pulse with the binary output pulses generated in the (b—2) successive combinations carried out in said modulo-two gate, where b is an odd integer greater than three, said modulo-two gate providing a binary output pulse of one polarity if the number of binary ones in said combination is even, and of the opposite polarity if the number of binary ones is odd;

(b) a remembering means adapted to remember (b—1) successive output pulses from said modulo-two gate, said remembering means having its input connected to the output of said modulo-two gate and its output terminals indicating said (b—1) successive combinations connected to the input of said modulo-two gate;

(c) inverting means for inverting the final (b—1)/2 of the (b—1) successive combinations remembered in said remembering means; and (d) an arithmetic adder for adding the (b—1) successive binary output pulses from said modulo-two gate remembered by said remembering means, including (b—1)/2 final pulses from said inverting means, to obtain a polybipolar output signal.

7. The apparatus of claim 6 further defined by said arithmetic adder comprising (b—1) resistors, one terminal of each comprising the several inputs and the remaining terminals being connected together to form the combined output.

8. Apparatus for converting a binary digital waveform into a polybipolar digital waveform, which apparatus comprises:

(a) a modulo-two gate for combining the present binary pulse with the binary output pulses generated in (b—1) successive combinations carried out in said modulo-two gate, where b is an odd integer greater than three, said modulo-two gate providing a binary output pulse of one polarity if the number of binary ones in said combination is even, and of the opposite polarity if the number of binary ones is odd;

(b) a remembering means, adapted to remember (b—1) successive output pulses, coupled to the output of said modulo-two gate for remembering the (b—1) previous output pulses from said modulo-two gate, said remembering means having separate output terminals indicating the said (b—2) successive combinations;

(c) a means for coupling said separate output terminals from said remembering means to the input of said modulo-two gate;

(d) inverting means for inverting the final (b—1)/2 of said (b—1) successive remembered combinations;

(e) a means for adding the output pulses from said remembering means corresponding to each of the (b—1) successive remembered combinations in said modulo-two gate, including the final (b—1)/2 inverted final pulses from said inverting means, to obtain a polybipolar digital waveform output signal; and (f) a means for coupling the binary output pulses from said remembering means, including said (b—1)/2 inverted final pulses, corresponding to each of the (b—1) successive combinations in said modulo-two gate, to said adding means, said adding means thereby providing as its output the corresponding polybipolar waveform.

9. Apparatus for converting a binary digital waveform into a polybipolar digital waveform, which apparatus comprises:

(a) a modulo-two gate for combining the present binary pulse with the binary output pulses generated in the (b—2) successive combinations carried out in said modulo-two gate, where b is an odd integer greater than three, said modulo-two gate providing a binary output pulse of one polarity if the number of binary ones in said combination is even, and of the opposite polarity if the number of binary ones is odd;

(b) a (b—1)-stage shift register having separate outputs for each stage;

(c) a means for coupling the output pulses from said modulo-two gate to the input of said shift register;

(d) a means for coupling the output pulses from said shift register corresponding to each of said (b—2) successive combinations in said modulo-two gate to the input of said modulo-two gate;

(e) inverting means for inverting the final (b—1)/2 of said (b—1) successive remembered combinations;

(f) an arithmetic adder for adding (b—1) successive output pulses from said shift register, including the (b—1)/2 inverted final pulses from said inverting means; and (g) a means for coupling the binary output pulses from said shift register corresponding to each of the successive (b—1) combinations in said modulo-two gate, including the (b—1)/2 final pulses from said inverting means to said adding means, said adding means thereby providing as its output the corresponding polybipolar waveform.

References Cited by the Examiner

UNITED STATES PATENTS 3,072,332 1/1963 Margopoulos ------- 235—154

DARYL W. COOK, *Acting Primary Examiner.*

MAYNARD R. WILBUR, A. L. NEWMAN, *Assistant Examiners.*